July 13, 1926.
F. W. FLEER
1,592,811
REPAIR DEVICE FOR RULES
Original Filed April 2, 1925
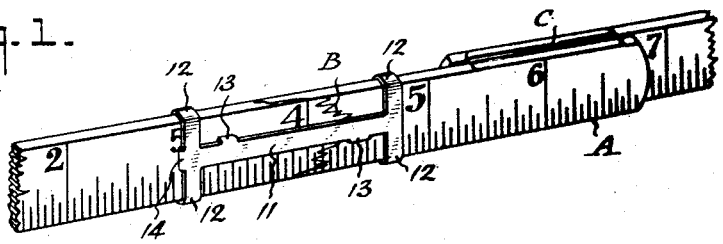
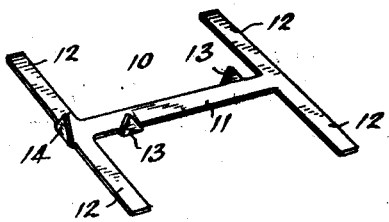
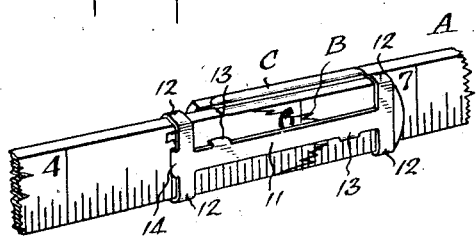
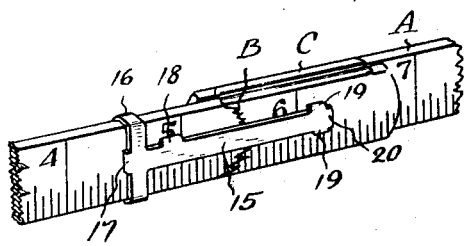
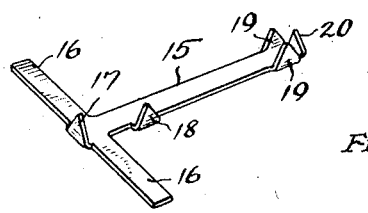
WITNESSES
INVENTOR
FREDERICK W. FLEER
BY
ATTORNEYS Patented July 13, 1926.

1,592,811

UNITED STATES PATENT OFFICE.

FREDERICK WILLIAM FLEER, OF BROOKLYN, NEW YORK.

REPAIR DEVICE FOR RULES.

Application filed April 2, 1925, Serial No. 20,282. Renewed April 13, 1926.

This invention relates to devices for repairing broken rules and aims as an object to provide, a simple, cheap and effective means for joining the broken sections of the rule together without the use of glue or any other adhesive.

More specifically the invention comprehends a repair device of the character set forth which includes connected embracing elements and anchoring spurs for anchoring embedment in the body of the rule whereby the broken sections are drawn and maintained together against separation in the ordinary use of the rule.

The invention furthermore contemplates a repair device which is subject to slight modifications whereby the same is rendered useful in connecting breaks in jointed rules either at, adjacent to or between the joints.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a fragmentary perspective view of a jointed rule illustrating the repair device applied to a break between the joints.

Fig. 2 is a similar view illustrating the repair device employed for mending the break at the joint.

Fig. 3 is a perspective view of the repair device removed from the rule.

Fig. 4 is a fragmentary perspective view of a rule illustrating a slightly modified form of repair device in its applied position for mending a break at the joint.

Fig. 5 is a perspective view of the modified form of repair device prior to its application to the rule.

Referring to the drawings by characters of reference 10 designates generally a repair device for rules which consists of a body or shank 11 and transversely oppositely extending arms 12 at its opposite ends, the side edges of the body or shank being provided with anchoring spurs 13 and further provided with an anchoring spur 14 at one end. The device is preferably stamped or otherwise formed from sheet metal or other suitable material. In repairing a rule indicated at A and in which B represents a break between the joints C thereof, the body or shank 11 of the device 10 is superimposed or applied to one face of the rule to straddle the break B with the shank disposed in the transverse center of the face to which it is applied. The spurs 13 and 14 are driven into the rule to anchor the device in place and to prevent both transverse and longitudinal shifting movement. The terminal arms 12 are bent around the edges with their extremities flattened against the opposite side face of the rule to that which the shank or body is applied so that the arms embrace the rule transversely. The shank or body 10 and the arms 12 are considerably narrower than the width of the rule face so as to minimize obstruction of the graduations and indicia relative thereto. In Fig. 1 the break B is indicated as between the joints while in Fig. 2 the break B is indicated directly at the joint C and the repair device is shown as in applied position for a break occurring at this point.

In Figs. 4 and 5 there is illustrated a modified adaptation of the invention in which the repair device consists of a body or shank 15 having laterally extending terminal arms 16 at one end thereof with an anchoring spur 17 at said end, and with an anchoring spur 18 at the side edge of the shank adjacent said end. In this instance, in lieu of providing the laterally extending arms at the opposite end, side anchoring spurs 19 and an end anchoring spur 20 in close relation are illustrated. In this form of the invention the device is especially designed for repairing rules in which the break B occurs at a point immediately adjacent the joint C and which necessarily precludes the use of the embracing arms at this point.

I claim:—

1. A repair device for broken rules comprising a shank adapted to be applied to the face of the rule and to straddle the break, said shank having a plurality of spurs at one terminal, a spur at the side edge of the shank adjacent its opposite end, a spur at the terminal of said opposite end and transversely bendable rule embracing arms extending transversely from said opposite end as and for the purpose specified.

2. A repair device for broken rules, comprising an elongated shank of relatively narrow width with respect to the rule, anchoring spurs at the side edges of the shank, and bendable arms at the side edges of the shank adapted to be bent into embracing relation transversely of the rule, whereby when the shank is in applied relation to the rule, the relatively narrow width of the same minimizes the concealment of the graduations and indicia thereon.

3. A repair device for broken rules, comprising a shank adapted to be applied to one of the faces of the rule and to straddle the break, said shank having anchoring spurs at its end and side edges and transversely bent rail-embracing arms at the side edges adapted to completely embrace the rule, the said shank being of a relatively narrow width with respect to the rule, whereby to minimize the concealment of the graduations and indicia thereon.

FREDERICK WILLIAM FLEER.